(12) United States Patent
Woolford et al.

(10) Patent No.: US 7,317,975 B2
(45) Date of Patent: Jan. 8, 2008

(54) VEHICLE TELEMATICS SYSTEM

(75) Inventors: Paul Woolford, Taby (SE); Roger Carlsson, Grodinge (SE)

(73) Assignee: Haldex Brake Products AB (SE)

( * ) Notice: Subject to any disclaimer, the term of this patent is extended or adjusted under 35 U.S.C. 154(b) by 656 days.

(21) Appl. No.: 10/770,822

(22) Filed: Feb. 3, 2004

(65) Prior Publication Data

US 2005/0171660 A1    Aug. 4, 2005

(51) Int. Cl.
*G06F 7/00* (2006.01)

(52) U.S. Cl. ......................................... 701/33; 701/213

(58) Field of Classification Search ..................... 701/1, 701/33, 35, 36, 70, 200, 207, 213
See application file for complete search history.

(56) References Cited

U.S. PATENT DOCUMENTS

| | | | |
|---|---|---|---|
| 5,223,844 A | 6/1993 | Manselli et al. | 342/357 |
| 5,694,322 A | 12/1997 | Westerlage et al. | 364/464.27 |
| 5,999,091 A | 12/1999 | Wortham | 340/431 |
| 6,339,736 B1 | 1/2002 | Moskowitz et al. | 701/29 |
| 6,968,272 B2 * | 11/2005 | Knockeart et al. | 701/210 |
| 7,117,075 B1 * | 10/2006 | Larschan et al. | 701/35 |
| 2002/0173889 A1 | 11/2002 | Odinak et al. | 701/36 |
| 2003/0009270 A1 | 1/2003 | Breed | 701/29 |
| 2003/0095038 A1 | 5/2003 | Dix | 340/425.5 |
| 2003/0216889 A1 | 11/2003 | Marko et al. | 702/182 |

FOREIGN PATENT DOCUMENTS

| | | |
|---|---|---|
| EP | 1 087 343 | 3/2001 |
| EP | 1 118 965 | 7/2001 |
| EP | 1 197 396 | 4/2002 |

OTHER PUBLICATIONS

International Search Report; Dec. 8, 2005; 3 pages.

* cited by examiner

*Primary Examiner*—Richard M. Camby
(74) *Attorney, Agent, or Firm*—St. Onge Steward Johnston & Reens LLC

(57) ABSTRACT

Disclosed is a system providing tracking and wireless communications for remote diagnostics of a vehicle which transmits data communicated over a vehicle system's CAN bus to a remote location, which is adapted to use data received from a vehicle in order to compare the performance of the vehicle and/or of the operator of the vehicle with the performance of other vehicles and/or operators of other vehicles, which incorporates advanced power management functionality for conserving power, particularly when the system is disconnected from a main power supply, and which facilitates the identification of vehicles that have not reported back to the system or that have not moved within a specified time period.

23 Claims, 4 Drawing Sheets

| Reg. No. | Alt. ID | Type/Grp. | Last Position | Date | Batt. | DTC | Weeks to Service |
|---|---|---|---|---|---|---|---|
| GHJ 564 | 4912 | Kapell | Västerås | 031102 | 5 | OK | 18 |
| MMD 781 | 4516 | Kapell | Göteborg | 031101 | 4 | OK | 3 |
| GWU 934 | 3845 | Skåp | Helsingborg | 031102 | 5 | OK | 8 |
|  |  | Kapell |  | 031102 | 5 | OK | -1 |
| KLU 664 | 3987 | Skåp | Jönköping | 031101 | 3 | OK | 5 |
| PLD 903 | 4312 | Skåp | Borlänge | 031101 | 5 | OK | 16 |
| HUL 644 | 4119 | Skåp | Falun |  | 4 | OK | 7 |
|  |  | Kapell | Strängnäs | 031101 | 2 | 523 | 1 |
| OFH 904 | 2798 | Kapell | Köpenhamn | 031101 | 5 | OK | 3 |
| JWS 786 | 4260 | Skåp |  | 031102 | 4 | OK | 12 |
|  |  | Kapell | Sundsvall | 031102 | 4 | OK | 8 |
| HGD 607 | 4188 | Kapell | Sundsvall | 031101 | 3 | PK | 9 |
| BNJ 765 | 4610 | Skåp | Helsingfors | 031101 | 4 | OK | 7 |

Select Vehicle Group: All Vehicles

= No report received from vehicle for more than 24 hours

= No vehicle movement registered in more than 72 hours

To view vehicles' last position on map, select vehicle(s) and press SHOW ON MAP

Figure 3

VEHICLE TELEMATICS SYSTEM

FIELD OF THE INVENTION

The present invention relates to methods and apparatus for diagnosing components in a vehicle and transmitting data relating to the diagnosis of the components in the vehicle and other information relating to the operating conditions of the vehicle, as well as the geographical position of the vehicle, to one or more remote locations distant from the vehicle, particularly via a telematics link.

BACKGROUND OF THE INVENTION

Generally, a telematics system refers to a system that combines telecommunications and information processing. More specifically, the term has evolved to refer to automobile systems that combine global positioning system (GPS) satellite tracking and wireless communications for automatic roadside assistance and remote diagnostics. This combination provides consumers with a multitude of services not previously available as described more fully below.

Communications between a vehicle and a remote assistance facility are important for many reasons. One of such reasons relates to the diagnosing of problems with the vehicle and forecasting problems with the vehicle, called prognostics. Modern motor vehicles contain complex mechanical systems that are monitored and regulated by computer systems such as electronic control units (ECUs) and the like. Such ECUs monitor various components of the vehicle including engine performance, carburation, speed/acceleration control, exhaust gas recirculation (EGR), electronic brake systems (EBS), antilock brake systems (ABS), suspension systems, traction control systems, anti-slip regulation (ASR) systems, steering systems, stability control systems, electronic stability programs (ESP), adaptive cruise control (ACC) systems, diagnostics systems, trailer interface systems, transmission systems, air management control systems, continuous brake retarder systems, engine control systems, etc. However, vehicles have traditionally performed such monitoring typically only for the vehicle driver and without communication of any impending results, problems and/or vehicle malfunction to a remote site for troubleshooting, diagnosis or prognostics. This limitation is remedied by telematics systems, several of which are known.

U.S. Published Patent Application No. US 2003/0009270 A1 discloses a vehicle diagnostic system which diagnoses the state of the vehicle or the state of a component of the vehicle and generates an output indicative or representative thereof. A communications device transmits the output of the diagnostic system to a remote location, possibly via a satellite or the Internet. The diagnostic system can include sensors mounted on the vehicle, each providing a measurement related to a state of the sensor or a measurement related to a state of the mounting location, and a processor coupled to the sensors and arranged to receive data from the sensors and process the data to generate the output indicative or representative of the state of the vehicle or its component. The processor may embody a pattern recognition algorithm trained to generate the output from the data received from the sensors and be arranged to control parts of the vehicle based on the output.

U.S. Published Patent Application No. US 2002/0173889 A1 discloses a vehicle device that combines the functionalities of integrating vehicle controls, monitoring systems, location tracking and wireless communications into a vehicle device with module receptacles to receive insertable modules that are replaceable, transferable, and upgradeable. The modules include functions for performing one of a plurality of telematic functions. The vehicle device includes a communication component, one or more removable modules, one or more module receptacles, memory, and a processor. The communication component communicates with a destination over a network. Each of the one or more removable modules performs at least one function. The one or more module receptacles receive the one or more removable modules. The processor is coupled to the memory, the one or more module receptacles, and the communication component.

U.S. Published Patent Application No. US 2003/0216889 A1 discloses a diagnostic/prognostic system which monitors performance of a vehicle or other apparatus wherein the vehicle has a plurality of operational components. Each operational component has a predetermined nominal operating state and generates respective electrical signals pursuant to its operation. A data collection memory in the vehicle stores samples of the electrical signals in a rolling buffer. An analyzer in the vehicle is responsive to the electrical signals for detecting a trigger event indicative of at least a potential variance of an operational component from its nominal operating state. A computation center located remotely from the vehicle has a database storing representations of electrical signals for classifying nominal and irregular operating states of the operational components. A transmitter is activated by the trigger event to transmit at least some of the stored samples in the rolling buffer at the time of the trigger event to the computation center. The computation center receives the transmitted samples and classifies them according to the nominal or irregular operating states.

Another reason that communications between a vehicle and a remote assistance facility are important relates to tracking of the vehicle. Such tracking may itself be important for a number of reasons, including responding to an emergency (such as vehicle theft, an accident, a breakdown, etc.). However, what may be even more important in certain circumstances is the ability to track movement of the vehicle when such vehicle is part of a large fleet of vehicles. For example, in the context of commercial trailers used to haul goods, the performance of vehicle operators is critical to the efficiency of the business. By tracking the vehicle, performance problems can be quickly identified. Moreover, also in the context of trailers, it is common for trailers to be disconnected from the tractors which haul them and left at various locations for loading/unloading or between uses. It is often difficult, particularly when an entity maintains a large fleet of trailers, to keep track of the locations of each of the trailers in the fleet.

U.S. Pat. No. 5,223,844 discloses a vehicle tracking and security system which allows immediate response in case of vehicle theft, an accident, vehicle breakdown, or other emergency. Guardian and tracking functions are provided through mobile units installed in hidden locations in vehicles to be monitored. The mobile units communicate with a control center. Preferably, the mobile unit provides vehicle theft and intrusion protection using an in-vehicle alarm and security system linked to the control center by a transceiver in the mobile unit. Also, a keypad or other human interface device is provided, allowing a vehicle driver or occupant to signal the control center that a particular type of assistance is needed. The vehicle's location may be automatically transmitted to the control center along with any automatic alarm signal or manually entered request, the location being precisely determinable anywhere in the world through use of global positioning system (GPS) information.

While the above-described prior art systems do provide global positioning system (GPS) satellite tracking and wireless communications for remote diagnostics, they suffer from a number of disadvantages. One of such disadvantages relates to the manner in which the systems communicate with the various vehicle systems. It is becoming common for advanced vehicle systems, such as electronic braking systems, to employ a control area network (CAN) bus by which the system controller (i.e., the electronic control unit (ECU)) communicates with various system components, with much information passing over this CAN bus. While this information is often pertinent to performing system diagnostics and prognostics, none of the prior art systems described above is communicable over the CAN bus, and therefore the pertinent information communicated over the CAN bus is not transmitted to the remote location for use in the diagnostics and/or prognostics. While U.S. Published Patent Application No. US 2002/0173889 A1 does disclose that the communications device disclosed therein is able to communicate with the CAN bus controller, the communications device is not connected into the CAN bus itself, and therefore even in this system, much of the pertinent information passing over the CAN bus may not be communicated to the remote location.

Another disadvantage of the systems disclosed in the afore-mentioned prior art references relates to the way in which data transmitted to the remote location is used, or more accurately, not used. In each of the prior art systems, the data received from the vehicle is used only to track and/or perform diagnostics concerning the particular vehicle from which the data is received. However, it may be desirable to use such data in order to compare the performance of the vehicle and/or of the operator of the vehicle with the performance of other vehicles and/or operators of other vehicles.

A further disadvantage of the systems disclosed in the afore-mentioned prior art references relates to the lack of advanced power management functionality. As should be obvious to one skilled in the art, any system for providing tracking and wireless communications for remote diagnostics of a vehicle will consume power. Also as should be obvious to one skilled in the art, the vehicle in which such a system operates only has a limited supply of power at its disposal. This is particularly true in the case of trailers. As opposed to cars, trucks, tractors, etc. which have a large power supply which is recharged with vehicle use, trailers (particularly when not being wheeled by a tractor) typically do not have their own on-board power supply. As such, systems for providing tracking and wireless communications for remote diagnostics must be provided with their own power supply (i.e., battery). It is undesirable from both cost management and space management standpoints to provide large power supplies for the systems to operate, and as such, advanced power management is critical, particularly when the trailer is parked and disconnected from a tractor.

Still another disadvantage of the systems disclosed in the afore-mentioned prior art references relates to the fact that none are particularly directed to managing a fleet of commercial vehicles where lack of movement of the vehicle for a relatively long duration is particularly important. For example, it is important from the standpoints of monitoring vehicle operator performance and identifying the positions of vehicles that have been parked and potentially lost to identify "slow movers" (i.e., vehicles that have not reported back to the system or that have not moved within a certain time period). None of the systems described above provide any functionality for facilitating the identification of such "slow movers."

What is desired, therefore, is a system for providing tracking and wireless communications for remote diagnostics of a vehicle which provides data communicated over a vehicle system's CAN bus to a remote location, which is adapted to use data received from a vehicle in order to compare the performance of the vehicle and/or of the operator of the vehicle with the performance of other vehicles and/or operators of other vehicles, which incorporates advanced power management functionality for conserving power, particularly when the system is disconnected from a main power supply, and which facilitates the identification of vehicles that have not reported back to the system or that have not moved within a specified time period.

SUMMARY OF THE INVENTION

Accordingly, it is an object of the present invention to provide a system for providing tracking and wireless communications for remote diagnostics of a vehicle which provides data communicated over a vehicle system's CAN bus to a remote location.

Another object of the present invention is to provide a system for providing tracking and wireless communications for remote diagnostics of a vehicle having the above characteristics and which is adapted to use data received from a vehicle in order to compare the performance of the vehicle and/or of the operator of the vehicle with the performance of other vehicles and/or operators of other vehicles.

A further object of the present invention is to provide a system for providing tracking and wireless communications for remote diagnostics of a vehicle having the above characteristics and which incorporates advanced power management functionality for conserving power, particularly when the system is disconnected from a main power supply.

Still another object of the present invention is to provide a system for providing tracking and wireless communications for remote diagnostics of a vehicle having the above characteristics and which facilitates the identification of vehicles that have not reported back to the system or that have not moved within a specified time period.

These and other objects of the present invention are achieved in one embodiment of the present invention by provision of a system for wireless transmission of vehicle data from a vehicle to a remote location. The system includes a vehicle system controller, at least one vehicle system component adapted to be controlled by the vehicle system controller, and a control area network connecting the vehicle system controller with the at least one vehicle system component, the vehicle system controller and the at least one vehicle system component communicating vehicle system data between one another via the control area network. A transmitter connected to the control area network wirelessly transmits the vehicle system data communicated over the control area network to the remote location.

In some embodiments, the vehicle system controller comprises an electronic brake system controller and the at least one vehicle system component comprises a component of an electronic brake system. In some embodiments, the vehicle system data comprises a control signal communicated from the vehicle system controller to the at least one vehicle system component. In some embodiments, the vehicle system data comprises a signal indicative of a condition of the at least one vehicle system component communicated from the at least one vehicle system component to the vehicle system controller. In some embodiments, the system further includes at least one vehicle system sensor connected to the control area network and in communication with the vehicle system controller via the control area network. In certain of these embodiments, the vehicle system data comprises a signal indicative of a condition sensed by the at least one vehicle system sensor communicated from the at least one vehicle system sensor to the vehicle system controller.

In accordance with another embodiment of the present invention, a system for wireless transmission of vehicle data from a vehicle to a remote location includes a vehicle system located on the vehicle, and a transmitter located on the vehicle, the transmitter wirelessly transmitting data indicative of operation of the vehicle system and indicative of a geographic location of the vehicle to the remote location. The system also includes a processor located at the remote location, the processor receiving the data transmitted by the transmitter and comparing the received data to data received from at least one other vehicle to produce comparison data.

In some embodiments, the processor compares the received data to aggregate data received from a plurality of other vehicles to produce comparison data. In some embodiments, the processor aggregates the received data with data received from a plurality of other vehicles to produce first aggregate data, and compared the first aggregate data to second aggregate data received from a plurality of other vehicles to produce comparison data. In some embodiments, the vehicle system comprises an electronic brake system.

In accordance with a further embodiment of the present invention, a system for wireless transmission of vehicle data from a vehicle to a remote location includes a transmitter located on the vehicle, the transmitter wirelessly transmitting data indicative of operation of the vehicle system and indicative of a geographic location of the vehicle to the remote location. The transmitter operates in a first mode when system is connected to a main power supply and the transmitter operates in a second mode when the vehicle is disconnected from the main power supply.

In some embodiments, the transmitter transmits the data more often in the first mode than in the second mode. In some embodiments, the transmitter operates in a third mode when the vehicle remains idle for a first time period. In certain of these embodiments, the transmitter transmits the data more often in the first mode than in the second mode, and the transmitter transmits the data more often in the second mode than in the third mode. In some embodiments, the first time period comprises a time period when a brake system of the vehicle has not been actuated. In some embodiments, the transmitter operates in a fourth mode when the vehicle remains idle for a second time period. In certain of these embodiments, the transmitter transmits the data more often in the first mode than in the second mode, the transmitter transmits the data more often in the second mode than in the third mode, and the transmitter transmits the data more often in the third mode than in the fourth mode. In certain of these embodiments, the first time period and the second time period comprise a time period when a brake system of the vehicle has not been actuated.

In accordance with another embodiment of the present invention, a system for wireless transmission of vehicle data from a vehicle to a remote location includes a transmitter located on the vehicle, the transmitter wirelessly transmitting data indicative a geographic location of the vehicle to the remote location periodically or from time to time. A processor located at the remote location receives the data transmitted by the transmitter and determines based at least in part on the received data whether the vehicle has moved a specified distance in a specified time period. The system also includes a display device in communication with the processor, the processor displaying on the display device information concerning the vehicle in a first manner if it is determined that the vehicle has moved the specified distance in the specified time period, and in a second manner visually distinctive from the first manner if it is determined that the vehicle has not moved the specified distance in the specified time period.

In some embodiments, display in the first manner comprises display in a first color and display in the second manner comprises display in a second color. In some embodiments, the processor further determines whether data has been received from the vehicle within a second specified time period, and the processor displays on the display device the information concerning the vehicle in a third manner visually distinctive from the first manner and the second manner if it is determined that data has not been received from the vehicle within the second specified time period. In some embodiments, display in the first manner comprises display in a first color, display in the second manner comprises display in a second color, and display in the third manner comprises display in a third color.

In accordance with still another embodiment of the present invention, a system for wireless transmission of vehicle data from a vehicle to a remote location includes a vehicle system controller, at least one vehicle system component adapted to be controlled by the vehicle system controller, and a control area network connecting the vehicle system controller with the at least one vehicle system component, the vehicle system controller and the at least one vehicle system component communicating vehicle system data between one another via the control area network. A transmitter connected to the control area network wirelessly transmits, periodically or from time to time, the vehicle system data communicated over the control area network and data indicative of a geographic location of the vehicle to the remote location. A processor located at the remote location receives the data transmitted by the transmitter and compares the received data to data received from at least one other vehicle to produce comparison data, the processor determining based at least in part on the received data whether the vehicle has moved a specified distance in a specified time period. The system also includes a display device in communication with the processor, the processor displaying on the display device information concerning the vehicle in a first manner if it is determined that the vehicle has moved the specified distance in the specified time period, and in a second manner visually distinctive from the first manner if it is determined that the vehicle has not moved the specified distance in the specified time period. The transmitter operates in a first mode when the vehicle is connected to a main power supply, and the transmitter operates in a second mode when the vehicle is disconnected from the main power supply.

The invention and its particular features and advantages will become more apparent from the following detailed description considered with reference to the accompanying drawings.

BRIEF DESCRIPTION OF THE DRAWINGS

FIGS. 3 and 4 are screen shots illustrating screens which may be shown on the display located at the remote location of the system for wireless transmission of vehicle data from a vehicle to a remote location shown in FIG. 1.

DETAILED DESCRIPTION OF AN EMBODIMENT OF THE INVENTION

Figure 1:
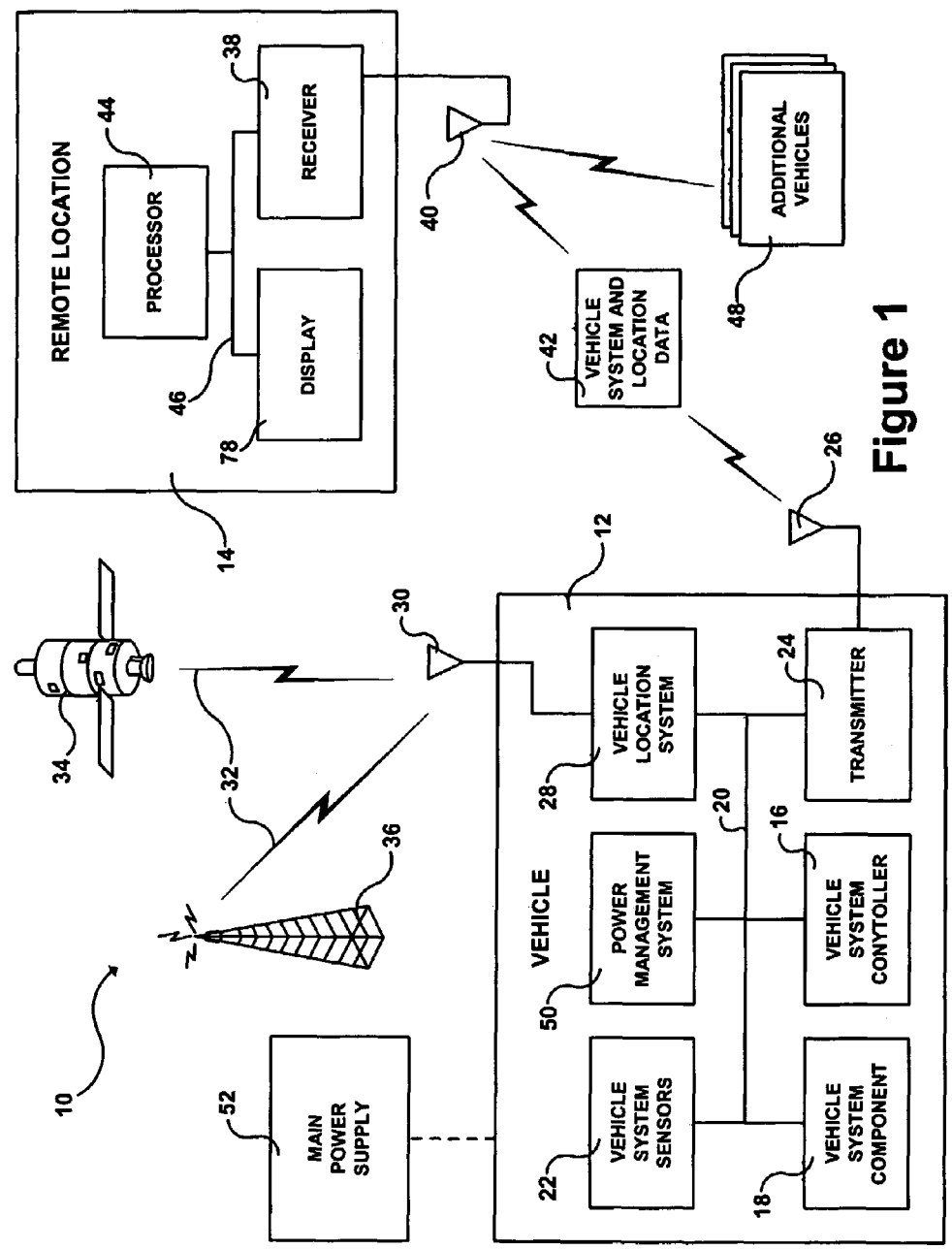
FIG. 1 is a schematic view of a system for wireless transmission of vehicle data from a vehicle to a remote location in accordance with one embodiment of the present invention.

Referring first to FIG. 1, a system 10 for wireless transmission of vehicle data from a vehicle 12 to a remote location 14 is shown. The vehicle 12 includes a vehicle system controller 16, at least one vehicle system component 18 adapted to be controlled by the vehicle system controller 16, and a communications link 20 connecting the vehicle system controller 16 with the vehicle system component(s) 18. The vehicle system controller 16 and the vehicle system component(s) 18 communicate vehicle system data between one another via the communications link 20.

Examples of vehicle systems which may be controlled include an electronic brake system (EBS), an antilock brake system (ABS), a suspension system, a traction control system, an anti-slip regulation (ASR) system, a steering system, a stability control system, an electronic stability program (ESP), an adaptive cruise control (ACC) system, a diagnostics system, a trailer interface system, a transmission system, an air management control system, a continuous brake retarder system, an engine control system, etc. Thus for example, the vehicle system controller 16 may be an electronic brake system controller. In this case, the vehicle system component(s) 18 would a component of an electronic brake system.

As is known in the art, vehicle system controller 16 includes an ECU having a program running thereon (which may be embodied in software, hardware, firmware, etc.) which receives input signals and generates output signals based at least in part upon the input signals. At least some of the output signals may include electronic control signals which are supplied to the vehicle system component(s) 18 via the communications link 20. The input signals may be indicative of a condition of the vehicle system component(s) 18 and may be communicated from vehicle system component 18(s) itself/themselves or may be indicative of various other conditions and be received from various vehicle system sensors 22 (such as wheel speed sensors, pressure sensors, force sensors, position sensors, temperature sensors, friction sensors, power sensors, acceleration sensors, pitch sensors, vehicle height sensors, vehicle weight sensors, etc.) and/or various manual inputs (not shown) manipulated by the vehicle operator (such as a brake pedal, gas pedal, gear shifter, steering wheel, emergency brake pedal, turn signal indicator, switches for performing various operations, etc.) via the communications link 20.

The communications link 20 may take the form of, for example, a data bus or a control network. However, in certain embodiments, it has been found that employing a control area network (CAN) bus for communications link 20 provides particularly desirable results. The system also includes a transmitter 24 connected to the communications link 20, the transmitter 24 wirelessly transmitting the vehicle system data communicated over the communications link 20 to the remote location 14. Thus, for example, in the case where communications link 20 is a CAN bus, transmitter 24, being attached to the CAN bus itself, is capable of transmitting vehicle data communicated over the CAN bus, as opposed to transmitting only data provided to the transmitter 24 by a CAN bus controller, as is the case with prior art systems. In this manner, system 10 is capable of transmitting all vehicle data communicated over the CAN bus, and not just select data relayed by the CAN bus controller.

The transmitter 24 may transmit data to remote location 14 by any of numerous wireless means, such as by way of radio transmissions, microwave transmissions, cell-phone networks, pager networks, etc. Transmitter 24 may employ one or more techniques for reducing the likelihood of signal interference, such as time division multiplexing, frequency division multiplexing, code division multiplexing or the like. Transmitter 24 may include an antenna 26 to enhance signal transmission.

The vehicle 12 also includes a vehicle location system 28 (which may be provided with an antenna 30) which receives one or more signals 32 from one or more satellite-based sources 34 and/or terrestrial sources 36 and generates location data indicative of a location of the vehicle 12 based upon the signals 32. More particularly, the vehicle location system 28 may employ satellite-based techniques, such as employing global positioning system (GPS) and/or server assisted GPS technology, and/or terrestrial techniques, such as employing an angle of arrival (AOA) technique, a time difference of arrival (TDOA) technique, an enhanced signal strength (ESS) technique, a location fingerprinting technique, and/or an ultra wideband location technique to generate the location data based upon the signals 32. The location data is transmitted by transmitter 24, along with the vehicle system data, to remote location 14, as described above.

System 10 also includes, at remote location 14, a receiver 38 (which may include an antenna 40) which receives the vehicle system and location data 42 transmitted by transmitter 24, and a processor 44 in communication with the receiver 38 via communications link 46. In certain embodiments, the remote location 14 receives vehicle system and location data from at least one vehicle 48 in addition to vehicle 12. The processor 44 compares the vehicle system and location data 42 received from vehicle 12 to vehicle system and location data received from the additional vehicle(s) 48 to produce comparison data. Preferably, the remote location 14 receives vehicle system and location data from a plurality of vehicles 48 in addition to vehicle 12. In these cases, the processor 44 may aggregate the vehicle system and location data received from the plurality of additional vehicles 48 to produce aggregate date, and then compare the vehicle system and position data 42 received from vehicle 12 to this aggregate data to produce comparison data. This allows for the comparison of the performance of the vehicle 12 and/or of the operator of the vehicle 12 with the performance of other vehicles and/or operators of other vehicles, which information may be useful for a number of reasons. In other cases, the processor 44 may aggregate the vehicle system and position data 42 received from vehicle 12 with the vehicle system and location data received from a first plurality of additional vehicles 48 to produce first aggregate date (representative, for example of a fleet of vehicles to which the vehicle 12 belongs), and then compare this first aggregate and data second aggregate data produced by aggregating vehicle system and location data received from a second plurality of additional vehicles 48 (representative, for example, of another fleet of vehicles) to produce comparison data. This allows for the comparison the performance of a fleet of vehicles to which the vehicle 12 belongs with the performance of other fleets of vehicles, which information may also be useful for a number of reasons.

The vehicle 12 also includes a power management system 50 for reducing the power consumption of the system 10 in certain circumstances (such as when the system 10 is disconnected from a main power supply 52). This may be particularly important when the vehicle 12 is a trailer (which typically does not have its own on-board power supply) which is not connected to a tractor. Although vehicle 12 would have its own power supply (not shown) to power system 10 even when not connected to main power supply 52, power management is important because the auxiliary power supply is typically relatively small.

The power management system 50 causes the system 10 to operates in a first mode when system 10 is connected to the main power supply 52 and to operate in a second mode when the system 10 is disconnected from the main power supply 52. In the first mode, the transmitter 24 transmits the vehicle system and location data 42 more often than in the second mode. Other functions of system 10 (e.g., location determination) may occur less frequently in the second mode as well. Preferably, the power management system 50 causes the system 10 to operate in a third mode when the vehicle 12 remains idle for a first time period (e.g., 1 hour), and causes the system 10 to operate in a fourth mode when the vehicle remains idle for a second time period (e.g., 24 hours). The transmitter 24 transmits the vehicle system and location data 42 (and other functions of system 10 may occur) less often in the third mode than in the second mode, and even less often in the fourth mode. The determination of whether the vehicle 12 has been idle may be based upon whether a brake system of the vehicle 12 has or has not been actuated.

Figure 2:
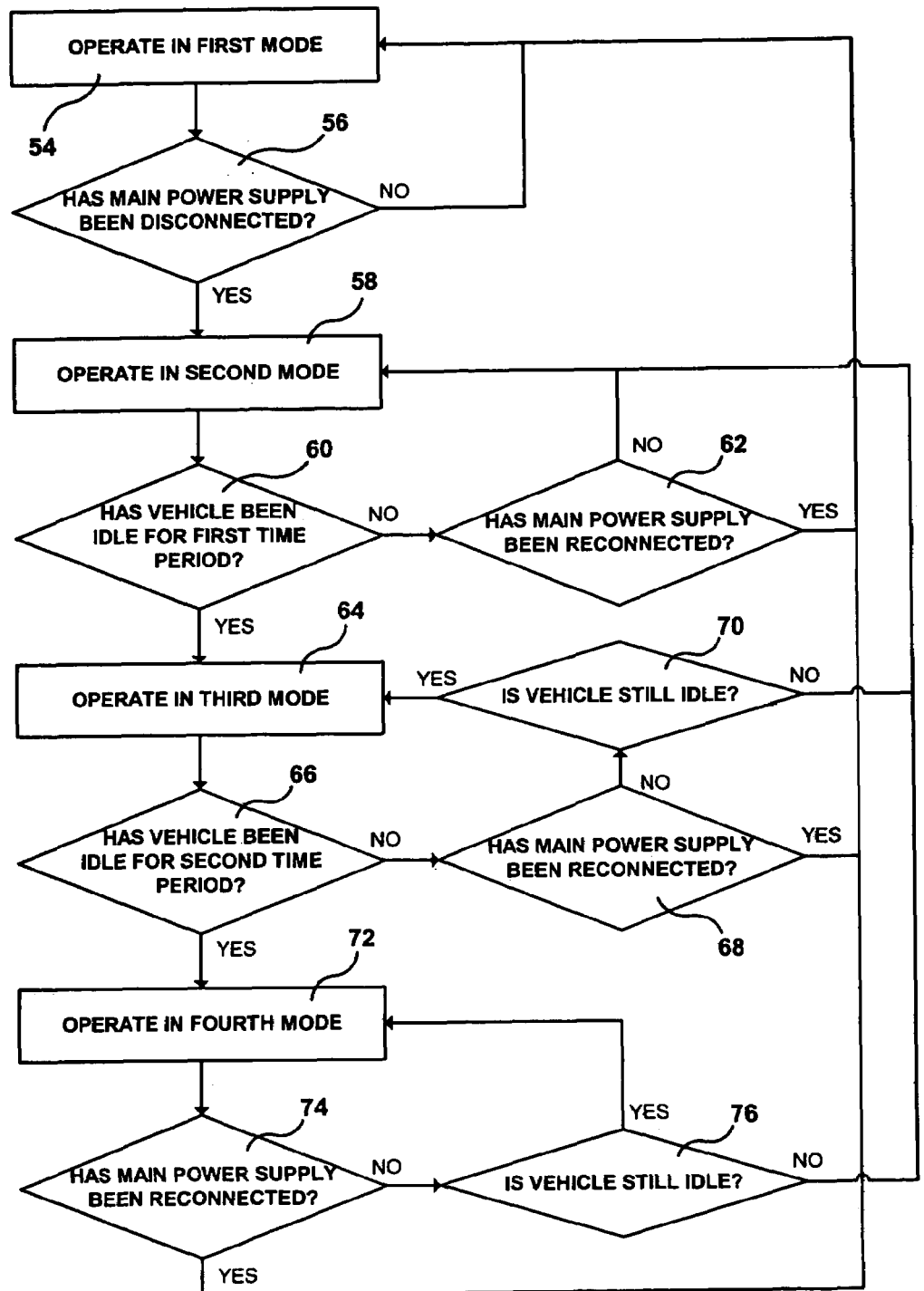
FIG. 2 is a flowchart illustrating operation of the power management system of the system for wireless transmission of vehicle data from a vehicle to a remote location shown in FIG. 1.

Operation of power management system 50 is shown in more detail in FIG. 2, which is now described. At block 54, system 10 operates in the first mode. At block 56, a determination is made as to whether system 10 has been disconnected from main power supply 52. If system 10 has not been disconnected from main power supply 52, system 10 continues to operate in the first mode. If, however, system 10 has been disconnected from main power supply 52, system 10 is caused to operate in the second mode (indicated by block 58).

While system 10 is operating in the second mode, a determination is made at block 60 as to whether the vehicle 12 has been idle for a first time period. If the vehicle 12 has not been idle for the first time period, a determination is made at block 62 as to whether the system 10 has been reconnected to main power supply 52, with operation of system 10 caused to return to operation in the first mode if the system 10 has been reconnected to main power supply 52 and remaining in operation in the second mode if the system 10 has not been reconnected to main power supply 52. If the vehicle 12 has been idle for the first time period (as determined at block 60), system 10 is caused to operate in the third mode (indicated by block 64).

While system 10 is operating in the third mode, a determination is made at block 66 as to whether the vehicle 12 has been idle for a second time period. If the vehicle 12 has not been idle for the second time period, a determination is made at block 68 as to whether the system 10 has been reconnected to main power supply 52, with operation of system 10 being caused to return to operation in the first mode if the system 10 has been reconnected to main power supply 52. If at block 68 it is determined that the system 10 has not been reconnected to main power supply 52, a determination is made at block 70 as to whether the vehicle 12 is still idle, with operation of the system 10 being caused to return to operation in the second mode if the vehicle 12 is no longer idle and with operation of the system 10 remaining in the third mode if the vehicle 12 remains idle. If the vehicle 12 has been idle for the second time period (as determined at block 66), system 10 is caused to operate in the fourth mode (indicated by block 72).

While system 10 is operating in the fourth mode, a determination is made at block 74 as to whether the system 10 has been reconnected to main power supply 52, with operation of system 10 being caused to return to operation in the first mode if the system 10 has been reconnected to main power supply 52. If at block 74 it is determined that the system 10 has not been reconnected to main power supply 52, a determination is made at block 76 as to whether the vehicle 12 is still idle, with operation of the system 10 being caused to return to operation in the second mode if the vehicle 12 is no longer idle and with operation of the system 10 remaining in the fourth mode if the vehicle 12 remains idle.

Figure 4:
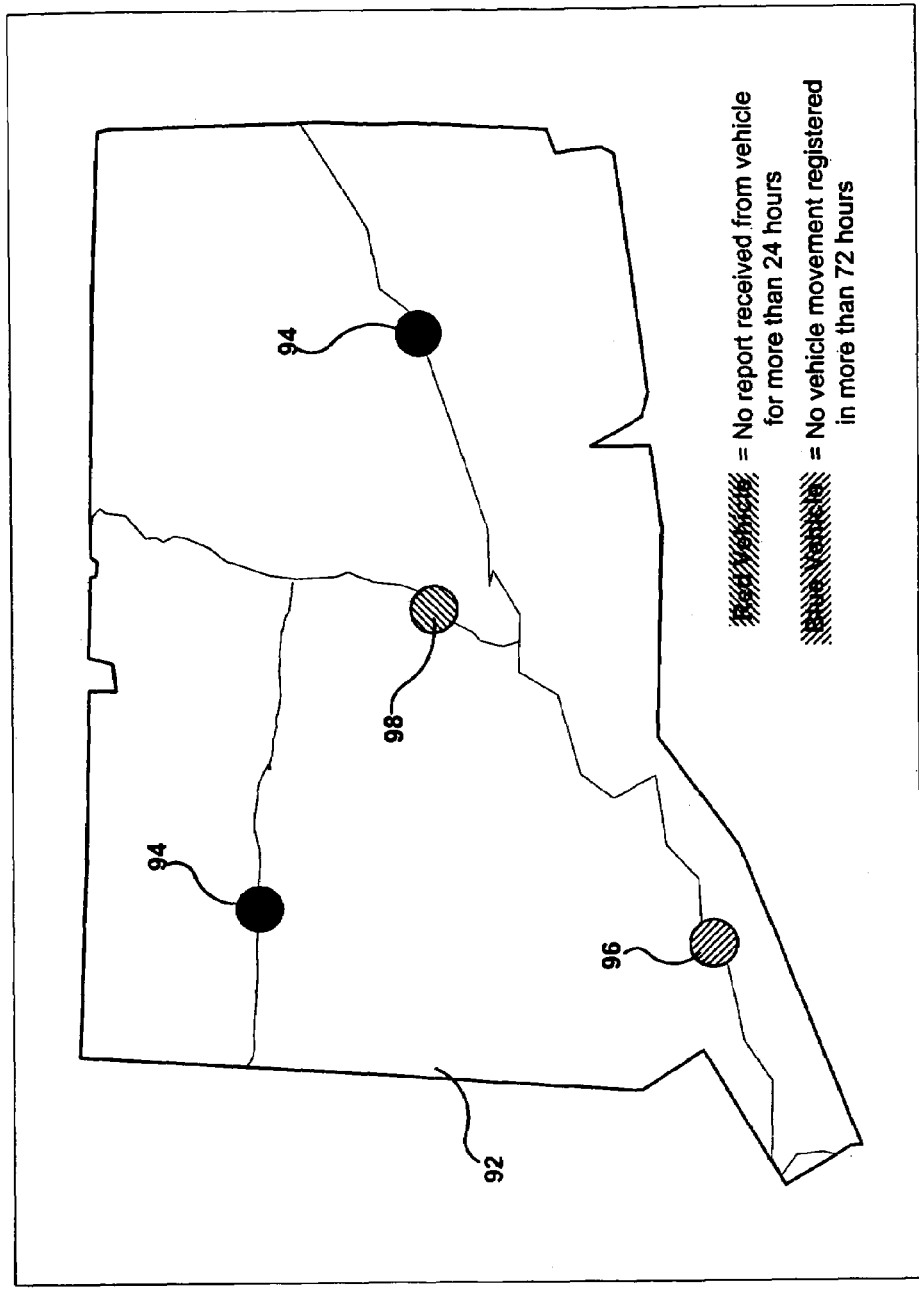

Referring now to FIGS. 1, 3 and 4, the transmitter 24 wirelessly transmits vehicle system and location data 42 to the remote location 14 periodically or from time to time. Processor 44 located at the remote location 14 receives the vehicle system and location data 42 and determines, based at least in part on the received vehicle system and location data 42, whether the vehicle 12 has moved a specified distance in a specified time period. The system 10 also includes a display device 78 in communication with the processor 44 via the communications link 46, the processor 44 displaying on the display device 78 information concerning the vehicle 12 in a first manner if it is determined that the vehicle has moved the specified distance in the specified time period, and in a second manner visually distinctive from the first manner if it is determined that the vehicle 12 has not moved the specified distance in the specified time period. Preferably, the processor 44 further determines whether vehicle system and location data 42 has been received from the vehicle 12 within a second specified time period, and the processor 44 displays on the display device 78 the information concerning the vehicle 12 in a third manner visually distinctive from the first manner and the second manner if it is determined that vehicle system and location data 42 has not been received from the vehicle 12 within the second specified time period.

For example, referring specifically to FIG. 3, a screenshot 80 showing a list 82 of vehicles (as well as pertinent information concerning each of the vehicles) currently being monitored by processor 44 is shown. As should be noted, most of the information 84 in list 82 is shown in a first manner. However, information 86 concerning two of the vehicles (i.e., ones for which no vehicle movement has been registered in more than 72 hours) in the list is shown in a second manner, visually distinctive from the first manner. On a color display, this information 86 shown in the second manner would be shown in blue text (indicated by left to right cross-hatching), while information 84 may be shown in black text. Further, information 88 concerning one of the vehicles (i.e., one from which no data has been received for more than 24 hours) in the list is shown in a third manner, visually distinctive from the first manner and the second manner. On a color display, this information 88 shown in the third manner would be shown in red text (indicated by right to left cross-hatching).

Referring now to FIG. 4, a similar scheme is illustrated in another screenshot 90. Each of the four circles on the map 92 represents information concerning (i.e., the location of) a vehicle which is currently being monitored by processor 44. Two of the circles 94 are shown in a first manner (i.e., in black). However, the circle 96 showing the location of one of the vehicles (i.e., one for which no vehicle movement has been registered in more than 72 hours) on the map 92 is shown in a second manner, visually distinctive from the first manner. On a color display, this circle 96 shown in the second manner would be shown in blue (indicated by left to right cross-hatching). Further, the circle 98 showing the location of one of the vehicles (i.e., one from which no data has been received for more than 24 hours) on the map 92 is shown in a third manner, visually distinctive from the first manner and the second manner. On a color display, this circle 98 shown in the third manner would be shown in red (indicated by right to left cross-hatching).

The present invention, therefore, provides a system for providing tracking and wireless communications for remote diagnostics of a vehicle which provides data communicated over a vehicle system's CAN bus to a remote location, which is adapted to use data received from a vehicle in order to compare the performance of the vehicle and/or of the operator of the vehicle with the performance of other vehicles and/or operators of other vehicles, which incorporates advanced power management functionality for conserving power, particularly when the system has been disconnected from a main power supply, and which facilitates the identification of vehicles that have not reported back to the system or that have not moved within a certain time period.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A system for wireless transmission of vehicle data from a vehicle to a remote location, said system comprising:
   a vehicle system controller;
   at least one vehicle system component adapted to be controlled by said vehicle system controller;
   a control area network bus connecting said vehicle system controller with said at least one vehicle system component, said vehicle system controller and said at least one vehicle system component communicating vehicle system data between one another via said control area network bus; and
   a transmitter connected to said control area network bus, said transmitter wirelessly transmitting the vehicle system data communicated over said control area network bus to said remote location.

2. The system of claim 1 wherein said vehicle system controller comprises an electronic brake system controller and wherein said at least one vehicle system component comprises a component of an electronic brake system.

3. The system of claim 1 wherein the vehicle system data comprises a control signal communicated from said vehicle system controller to said at least one vehicle system component.

4. The system of claim 1 wherein the vehicle system data comprises a signal indicative of a condition of said at least one vehicle system component communicated from said at least one vehicle system component to said vehicle system controller.

5. The system of claim 1 further comprising at least one vehicle system sensor connected to said control area network and in communication with said vehicle system controller via said control area network.

6. The system of claim 5 wherein the vehicle system data comprises a signal indicative of a condition sensed by said at least one vehicle system sensor communicated from said at least one vehicle system sensor to said vehicle system controller.

7. A system for wireless transmission of vehicle data from a vehicle to a remote location, said system comprising:
   a vehicle system located on said vehicle;
   a transmitter located on said vehicle, said transmitter wirelessly transmitting data indicative of operation of said vehicle system and indicative of a geographic location of said vehicle to said remote location;
   a processor located at said remote location, said processor receiving the data transmitted by said transmitter and comparing the received data to data received from at least one other vehicle to produce comparison; and
   wherein said vehicle system comprises an electronic brake system.

8. The system of claim 7 wherein said processor compares the received data to aggregate data received from a plurality of other vehicles to produce comparison data.

9. The system of claim 7 wherein said processor aggregates the received data with data received from a plurality of other vehicles to produce first aggregate data, and compared the first aggregate data to second aggregate data received from a plurality of other vehicles to produce comparison data.

10. A system for wireless transmission of vehicle data from a vehicle to a remote location, said system comprising:
    a transmitter located on said vehicle, said transmitter wirelessly transmitting data indicative of operation of said vehicle system and indicative of a geographic location of said vehicle to said remote location;
    wherein said transmitter operates in a first mode when said system is connected to a main power supply; and
    wherein said transmitter operates in a second mode when said system is disconnected from the main power supply.

11. The system of claim 10 wherein said transmitter transmits the data more often in the first mode than in the second mode.

12. The system of claim 10 wherein said transmitter operates in a third mode when said vehicle remains idle for a first time period.

13. The system of claim 12 wherein said transmitter transmits the data more often in the first mode than in the second mode, and said transmitter transmits the data more often in the second mode than in the third mode.

14. The system of claim 12 wherein the first time period comprises a time period when a brake system of said vehicle has not been actuated.

15. The system of claim 12 wherein said transmitter operates in a fourth mode when said vehicle remains idle for a second time period.

16. The system of claim 15 wherein said transmitter transmits the data more often in the first mode than in the second mode, said transmitter transmits the data more often in the second mode than in the third mode, and said transmitter transmits the data more often in the third mode than in the fourth mode.

17. The system of claim 15 wherein the first time period and the second time period comprise a time period when a brake system of said vehicle has not been actuated.

18. A system for wireless transmission of vehicle data from a vehicle to a remote location, said system comprising:

a transmitter located on said vehicle, said transmitter wirelessly transmitting data indicative a geographic location of said vehicle to said remote location periodically or from time to time;

a processor located at said remote location, said processor receiving the data transmitted by said transmitter and determining based at least in part on the received data whether said vehicle has moved a specified distance in a specified time period; and a display device in communication with said processor, said processor displaying on said display device information concerning said vehicle in a first manner if it is determined that said vehicle has moved the specified distance in the specified time period, and in a second manner visually distinctive from the first manner if it is determined that said vehicle has not moved the specified distance in the specified time period.

19. The system of claim 18 wherein display in the first manner comprises display in a first color and wherein display in the second manner comprises display in a second color.

20. The system of claim 18 wherein said processor further determines whether data has been received from said vehicle within a second specified time period, and wherein said processor displays on said display device the information concerning said vehicle in a third manner visually distinctive from the first manner and the second manner if it is determined that data has not been received from said vehicle within the second specified time period.

21. The system of claim 20 wherein display in the first manner comprises display in a first color, wherein display in the second manner comprises display in a second color, and wherein display in the third manner comprises display in a third color.

22. A system for wireless transmission of vehicle data from a vehicle to a remote location, said system comprising:
a vehicle system controller;
at least one vehicle system component adapted to be controlled by said vehicle system controller;
a control area network bus connecting said vehicle system controller with said at least one vehicle system component, said vehicle system controller and said at least one vehicle system component communicating vehicle system data between one another via said control area network bus;

a transmitter connected to said control area network bus, said transmitter wirelessly transmitting, periodically or from time to time, the vehicle system data communicated over said control area network bus and data indicative of a geographic location of said vehicle to said remote location;

a processor located at said remote location, said processor receiving the data transmitted by said transmitter and comparing the received data to data received from at least one other vehicle to produce comparison data, said processor determining based at least in part on the received data whether said vehicle has moved a specified distance in a specified time period;

a display device in communication with said processor, said processor displaying on said display device information concerning said vehicle in a first manner if it is determined that said vehicle has moved the specified distance in the specified time period, and in a second manner visually distinctive from the first manner if it is determined that said vehicle has not moved the specified distance in the specified time period;

wherein said transmitter operates in a first mode when said system is connected to a main power supply; and wherein said transmitter operates in a second mode when said system is disconnected from the main power supply.

23. A system for wireless transmission of vehicle data from a vehicle to a remote location, said system comprising:
a vehicle system located on said vehicle;
a transmitter located on said vehicle, said transmitter wirelessly transmitting data indicative of operation of said vehicle system and indicative of a geographic location of said vehicle to said remote location;
a processor located at said remote location, said processor receiving the data transmitted by said transmitter and comparing the received data to data received from at least one other vehicle to produce comparison data; and
wherein said processor aggregates the received data with data received from a plurality of other vehicles to produce first aggregate data, and compared the first aggregate data to second aggregate data received from a plurality of other vehicles to produce comparison data.

* * * * *